(12) United States Patent
Draht et al.

(10) Patent No.: US 9,731,340 B2
(45) Date of Patent: Aug. 15, 2017

(54) PROCESS MONITORING FOR HIGH-SPEED JOINING

(75) Inventors: Torsten Draht, Schloss Holte (DE); Adnan Kolac, Bielefeld (DE)

(73) Assignee: Böllhoff Verbindungstechnik GmbH (DE)

( * ) Notice: Subject to any disclaimer, the term of this patent is extended or adjusted under 35 U.S.C. 154(b) by 1271 days.

(21) Appl. No.: 13/503,595

(22) PCT Filed: Oct. 21, 2010

(86) PCT No.: PCT/EP2010/006444
§ 371 (c)(1),
(2), (4) Date: Jul. 10, 2012

(87) PCT Pub. No.: WO2011/047862
PCT Pub. Date: Apr. 28, 2011

(65) Prior Publication Data
US 2012/0271581 A1    Oct. 25, 2012

(30) Foreign Application Priority Data
Oct. 21, 2009 (DE) .................... 10 2009 050 200

(51) Int. Cl.
*B21J 15/02* (2006.01)
*B21J 15/28* (2006.01)
(Continued)

(52) U.S. Cl.
CPC ........... *B21J 15/285* (2013.01); *B21J 15/025* (2013.01); *B21J 15/28* (2013.01); *B21J 15/32* (2013.01); *F16B 5/04* (2013.01); *F16B 19/1045* (2013.01)

(58) Field of Classification Search
CPC ....... B21J 15/28; B21J 15/285; B21J 15/2855
(Continued)

(56) References Cited

U.S. PATENT DOCUMENTS 3,858,430 A * 1/1975 Kushnarenko ......... B21J 15/185
29/421.2
5,383,370 A    1/1995 Abramson et al.
(Continued)

FOREIGN PATENT DOCUMENTS

CN    101389285 A    3/2009
DE    197 52 367 A1    5/1999
(Continued)

OTHER PUBLICATIONS

Watsham et al., Quantitative Methods in Finance, Cengage Learning EMEA, 1997, pp. 102-103.*
(Continued)

*Primary Examiner* — Gregory J Toatley
*Assistant Examiner* — Michael Dalbo
(74) *Attorney, Agent, or Firm* — Barclay Damon, LLP

(57) ABSTRACT

A process monitoring method for a joining operation of a joining element at a speed of at least 5 m/s, in particular placing a bolt at least 10 m/s into at least one component with the aid of a placing device which has the following features: A plunger for placing the joining element, a buffer which limits a maximum deflection of the plunger in the joining direction, and a distance measurement with which the deflection of the plunger can be detected, wherein the process monitoring comprises the following steps: Detecting the travel of the plunger during the joining operation as a function of time in the form of a distance-time curve, detecting a placement of the plunger on the buffer, evaluating the distance-time curve such that, in the presence of at least one maximum followed by at least one minimum in the distance-time curve and without the plunger contacting the buffer, a joint connection is judged to be OK.

13 Claims, 6 Drawing Sheets

Figure 1:
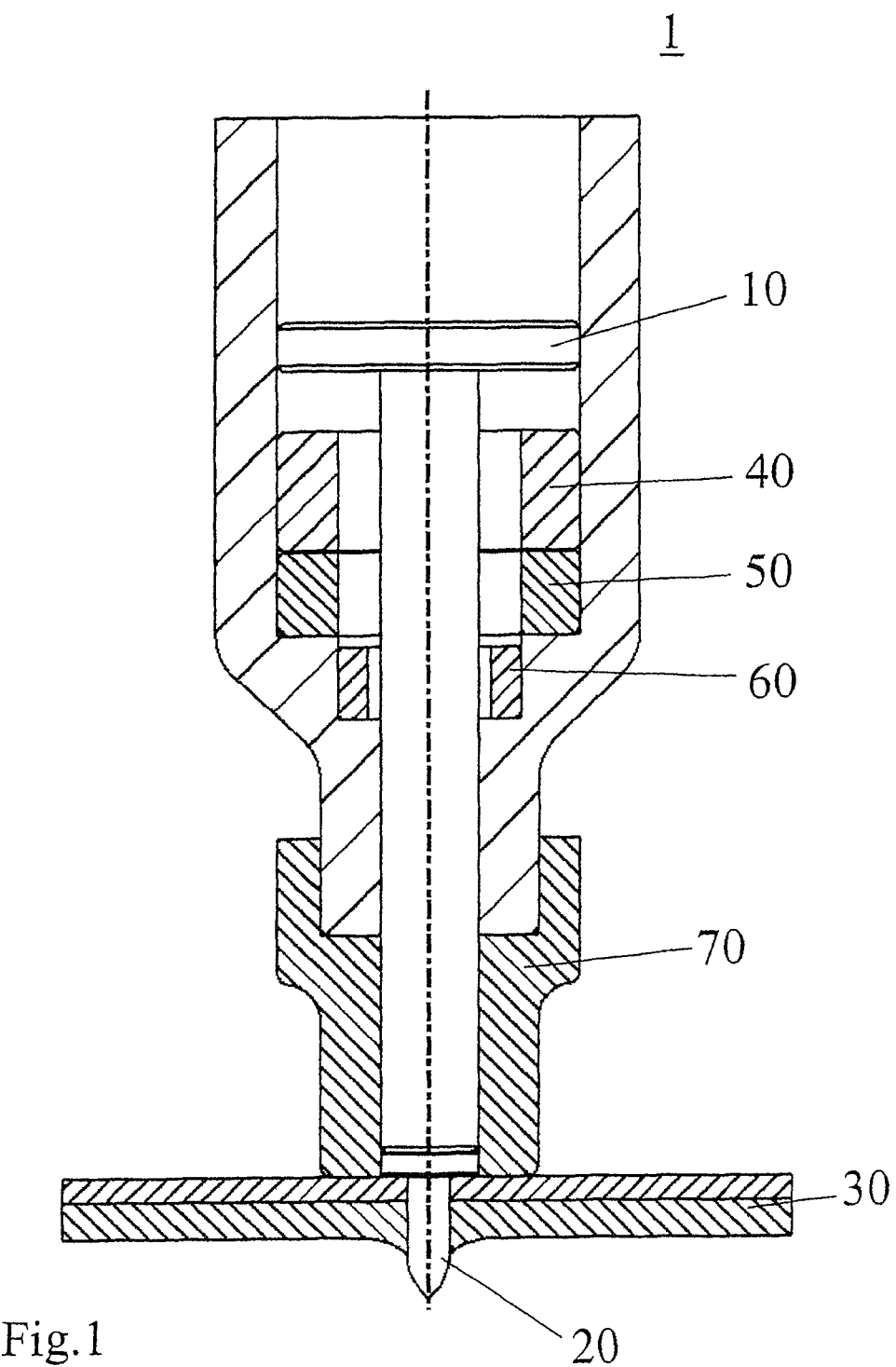

(51) Int. Cl.
*B21J 15/32* (2006.01)
*F16B 19/10* (2006.01)
*F16B 5/04* (2006.01)

(58) Field of Classification Search
USPC .................................................. 702/82, 158
See application file for complete search history.

(56) References Cited

U.S. PATENT DOCUMENTS

| | | | | |
|---|---|---|---|---|
| 6,024,835 | A * | 2/2000 | Fiore | D21G 9/0009 162/198 |
| 6,067,696 | A * | 5/2000 | Cecil | B23P 19/062 29/407.01 |
| 6,279,371 | B1 * | 8/2001 | Brewer | B21J 15/02 72/437 |
| 8,052,621 | B2 | 11/2011 | Wallace et al. | |
| 8,782,899 | B2 | 7/2014 | Draht et al. | |
| 2005/0180837 | A1 * | 8/2005 | Matsunaga | F16B 19/1054 411/43 |
| 2006/0137166 | A1 * | 6/2006 | Babej | B23P 19/062 29/509 |
| 2006/0207079 | A1 * | 9/2006 | Mauer | B21J 15/025 29/243.53 |
| 2007/0101785 | A1 * | 5/2007 | Peckham | B21J 15/02 72/17.2 |
| 2008/0222873 | A1 | 9/2008 | Draht et al. | |
| 2009/0000801 | A1 | 1/2009 | Calvet et al. | |
| 2009/0194574 | A1 * | 8/2009 | Shima | B25C 5/15 227/136 |
| 2010/0005639 | A1 * | 1/2010 | Muller | B23P 19/02 29/256 |
| 2010/0257720 | A1 | 10/2010 | Schiffler et al. | |

FOREIGN PATENT DOCUMENTS

| | | | |
|---|---|---|---|
| DE | 20 2006 000 666 U1 | 4/2006 | |
| DE | 10 2006 002 237 A1 | 7/2007 | |
| DE | WO 2008009299 A1 * | 1/2008 | ............. B23P 19/02 |
| DE | 10 2007 033 126 A1 | 1/2009 | |
| DE | 10 2006 002 238 B4 | 6/2009 | |
| DE | 10 2007 059 42 A1 | 6/2009 | |
| JP | 2009-183975 | 8/2009 | |

OTHER PUBLICATIONS

International Search Report/Written Opinion for PCT Application No. PCT/EP2010/006444; mailed Feb. 7, 2011; 12 pages.
Chinese Office Action and Search Report for CN 201080047387.6; dated Dec. 4, 2013; 5 pages.
German Office Action for DE 10 2009 050 200.9; dated Jan. 14, 2010; 3 pages.

* cited by examiner

PROCESS MONITORING FOR HIGH-SPEED JOINING

1. FIELD OF THE INVENTION

The present invention relates to a process monitoring method for a joining operation of a joining element at a speed of at least 5 m/s, in particular setting a bolt at least 10 m/s. Furthermore the present invention comprises a method for testing a joint connection without destroying the joint.

2. BACKGROUND OF THE INVENTION

Various methods are known in the prior art for creating a joint connection. For these methods to be reliably employed, process monitoring methods need to run at the same time as the joining methods. Process monitoring of this nature evaluates the quantities associated with the joining method and signals if a produced joint is in order (OK) or not.

With known joining methods, the force-distance curves are recorded during the joining operation. These force-distance curves indicate the force exerted by the plunger on the joining element as a function of the distance traveled by the plunger. It has been shown that this approach is not universally applicable to any and all joining methods.

It is therefore the object of the present invention to provide a process monitoring method for an operation of joining a joining element at a speed of at least 5 m/s.

3. SUMMARY OF THE INVENTION

The aforementioned object is achieved by a process monitoring method according to independent claim 1. In addition, the present invention discloses a method for the nondestructive testing of a joint according to claim 13. Advantageous embodiments and further developments of the present invention result from the description, the drawings and the attached claims.

The process monitoring method according to the invention is for monitoring a joining operation for a joining element at a speed of at least 5 m/s, in particular placing or setting a bolt at least 10 m/s in at least one component with the aid of a placing or setting device. The placing or setting device has the following features: A plunger for setting the joining element, a buffer which limits a maximum deflection of the plunger in the joining direction, and a distance measurement with which the deflection of the plunger can be detected. On this basis, the process monitoring method comprises the following steps: Detecting the path of the plunger during the joining operation as a function of time in the form of a distance-time curve, detecting a contact of the plunger on the buffer, evaluating the distance-time curve such that, in the presence of at least one maximum followed by at least one minimum in the distance-time curve and without the plunger contacting the buffer, a joint connection is judged to be in order (OK).

With the assistance of the method according to the invention, the plunger distance as a function of time is used as a reference quantity for the quality of the invention, in contrast to previous types of process monitoring. This holds true for high-speed joining in particular in which the joining elements are joined at a speed of at least 5 m/s. During the joining operation, the plunger not only drives the joining element into at least one component, the plunger also experiences a reaction from a component to the joining element being driven into the at least one component. This component reaction causes the plunger to move opposite the joining direction. Consequently, the joining operation covers a period in which the placing device is operated at the joining site and experiences the reactive force from the joining site. When the distance-time curve of the plunger is recorded, one can read from it the component reaction during the joining operation and hence the quality of the created invention. This evaluation assumes that the at least one minimum and the at least one maximum have been recorded in the distance-time curve so that corresponding inferences can be made regarding the quality of the created joint connection. This information is supplemented by whether or not the plunger contacts the buffer during the joining operation. If the plunger accordingly contacts the buffer, it indicates that the joining element has been joined with a certain amount of excess energy. This excess energy causes the created joint to be weaker and is necessarily considered not in order.

According to various preferred designs, the contacting of the plunger on the setting device buffer is detected, and a corresponding signal is recorded. According to one embodiment, the buffer comprises an electric switch that can be triggered by the plunger. The following step is therefore added to the process monitoring method: An electrical signal is triggered by the buffer when the plunger is being placed on the buffer. According to another embodiment, the buffer comprises a force sensor that detects the contacting force of the plunger when it contacts the buffer. In this design embodiment, the following step is added to the process monitoring method: A placing force is output by the buffer when the plunger contacts the buffer. It is also preferable to define the plunger contacting the buffer below a minimum placing or contacting force as the plunger not contacting the buffer.

To evaluate the distance-time curve, it is also preferable to form the first and second derivation of the distance-time curve over time to determine the at least one maximum and the at least one minimum.

It is also preferable to determine a process window for the joining operation before the process monitoring method during the joining operation. In this context, the joining energy to be supplied to the joining element is empirically determined along with the distance to be traveled by the joining element to achieve a connection that is in order. The plunger should not contact the buffer. When determining the joining energy, a plurality of joints is created for which the joining energy is intentionally varied. In order to determine the appropriate joining energy for the joints to be created, the created joints are subsequently evaluated. When judging whether the joint is in order (OK) or not in order (NOK), the created joint is preferably subjected to a visual inspection. According to one alternative, the visual inspection comprises inspecting the protrusion of the head of the joined joining element.

According to another alternative, the torque of the joined joining element is inspected. This torque test preferably comprises rotating the joined joining element at a specific torque so that the connection can be qualified as OK if the joining element fails to rotate. The torque test is accordingly a nondestructive test of a created joint.

In the same manner, it is preferable to determine the quality of a created joint with reference to the tensile strength of the head of the joining element while removing the joining element from the at least one component. The joining energy suitable for creating a joint can therefore be determined on the basis of the determined quality of the created joints. In the case of hydraulically and pneumatically operated setting devices, the pressure range is determined as a reference for the joining energy supplied to the joining element during pneumatic or hydraulic joining. It is also preferable to create the joint using an electromechanical setting device. In this case, a plunger speed range is determined during the electromechanical joining of a joining element which serves as reference of the joining energy supplied to the joining element.

As an element of the process monitoring method summarized above, the present invention also discloses a method for nondestructively testing a joint connection, especially a connection consisting of a bolt and at least one component. This testing method comprises the following steps: The joining element of the joint is rotated with a defined torque, and the rotation is evaluated such that the joint is qualified as being OK when the joining element fails to rotate when the defined torque is applied.

4. BRIEF DESCRIPTION OF THE ACCOMPANYING DRAWINGS

Figure 2:
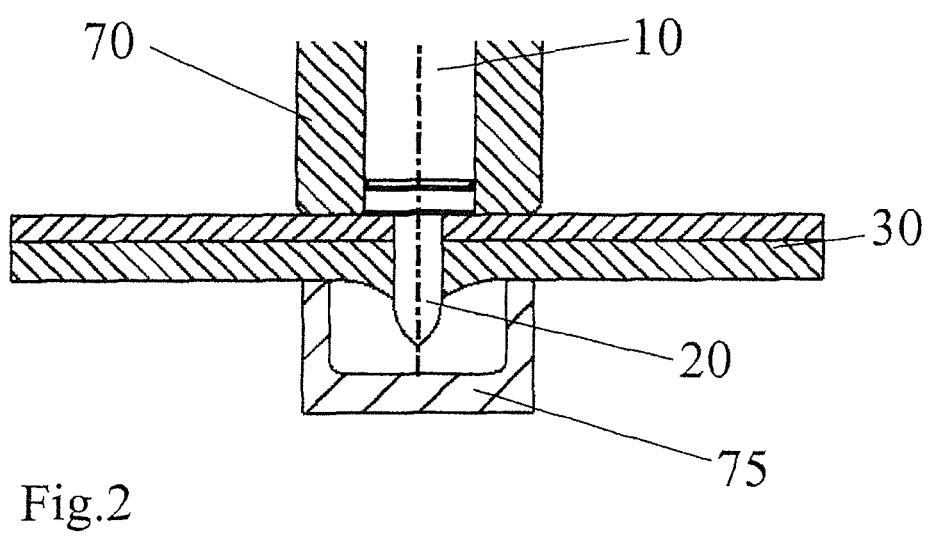
Figure 3:
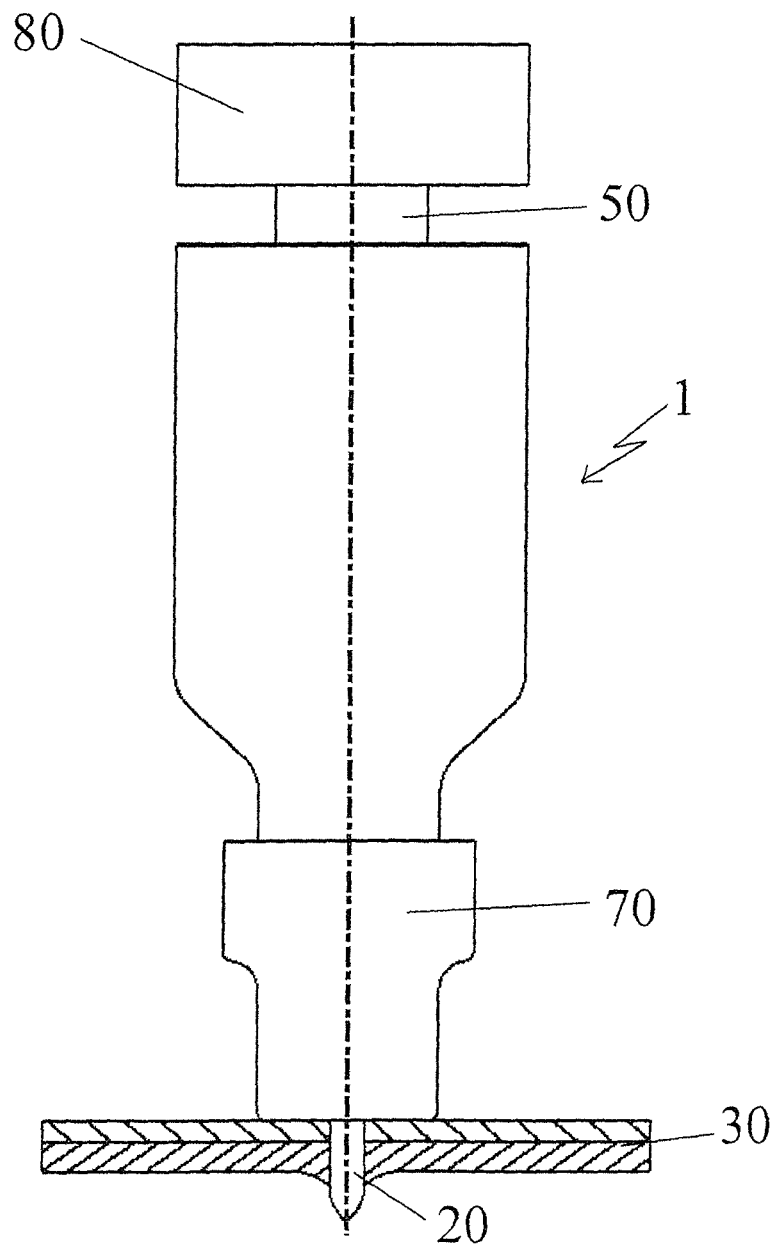
Figure 4A:
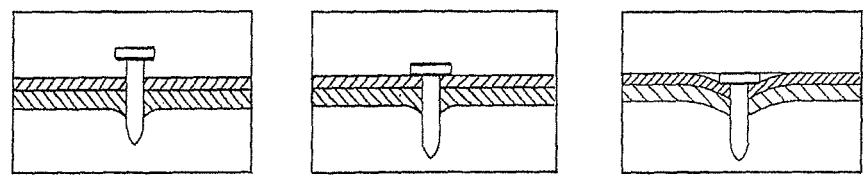
Figure 4B:
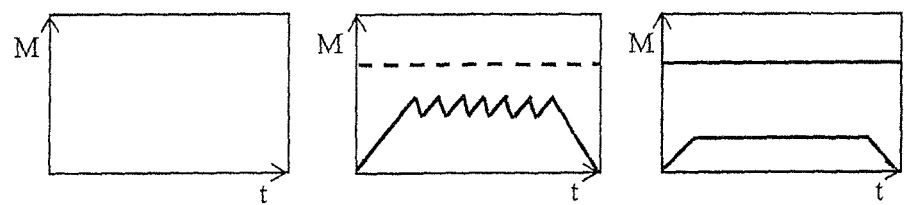
Figure 4C:
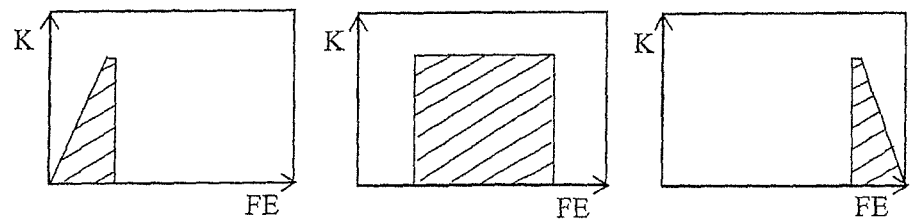
Figure 5A:
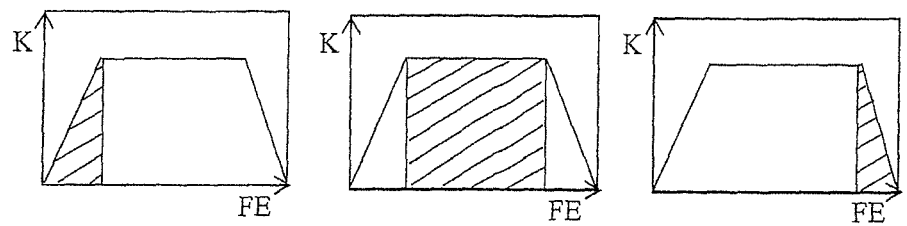
Figure 5B:
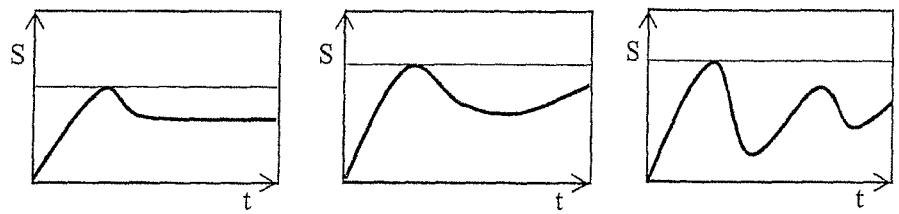
Figure 5C:
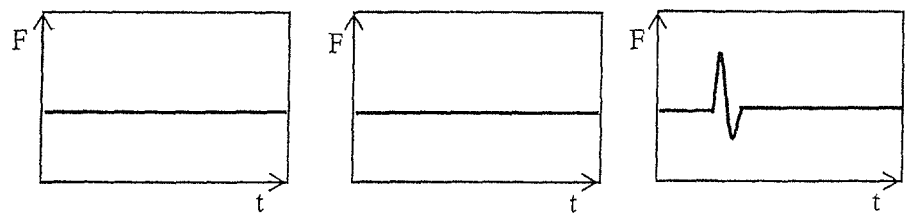
Figure 5D:
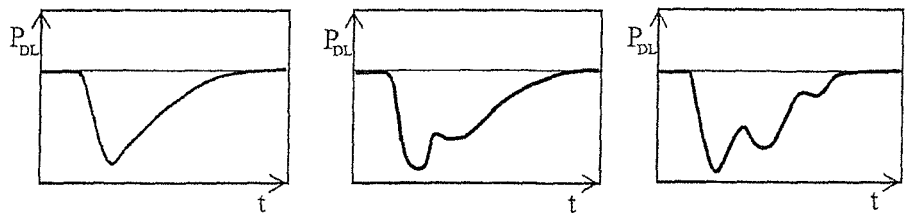
Figure 6:
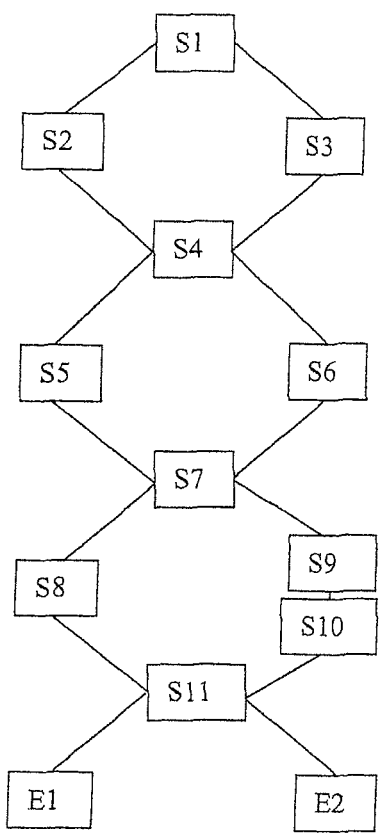

The present invention is explained in greater detail using the accompanying drawing. In the figures:

FIG. 1 shows a schematic representation of a preferred placing or setting device, FIG. 2 shows a schematic representation of a preferred section of a placing or setting device, FIG. 3 shows another schematic representation of a preferred placing or setting device, FIG. 4a-4c show preferred schematic diagrams to describe the preferred process monitoring method, FIG. 5a-5d show schematic diagrams to describe the preferred process monitoring method, and FIG. 6 shows a flow chart of a preferred embodiment of the process monitoring method.

5. DETAILED DESCRIPTION OF PREFERRED EMBODIMENTS

FIG. 1 shows a schematic representation of a preferred placing or setting device 1 for the high-speed joining of a joining element 20. The joining element 20 is joined at a speed of at least 5 m/s, preferably at least 10 m/s, in at least one component 30. An example of the joining element 20 is a bolt as described in DE 10 2006 002 238, DE 20 2006 000 666, and DE 10 2007 033 126. Furthermore, the process monitoring described here can be used in the same manner for the high-speed joining of punch rivets and high-speed joining by means of clinching.

The placing or setting device 1 comprises a housing in which a plunger 10 is arranged so as to be linearly movable. The plunger 10 moves in the direction of joining, i.e. toward the components 30, and opposite the joining direction. The plunger 10 is preferably actuated pneumatically by means of a pneumatic piston-cylinder drive. It is also preferable to drive the plunger 10 hydraulically by means of a hydraulic piston-cylinder arrangement. Another embodiment of the present invention uses an electromotive drive for the plunger 10. Such an electromotive drive consists for example of an electrically driven spindle drive, or a similarly functioning linear drive.

To prevent the plunger 10 from being damaged during the joining operation, a buffer 40 is provided under the plunger in the direction of joining. The buffer 40 dampens the movement of the plunger 10 in the joining direction when the plunger 10 contacts the buffer 40. According to one embodiment of the present invention, the buffer 40 is connected to an electric switch 50. Once the plunger 10 contacts the buffer 40, the switch 50 is triggered and generates a corresponding electric signal. The electric signal is sent to a control unit such as a computer to be used in the monitoring of the process.

It is also preferable to provide a force sensor 50 in combination with the buffer 40. When the plunger 10 contacts the buffer 40, the force sensor 50 detects the force with which the plunger 10 compresses the buffer 40. The placing force of the plunger 10 on the buffer 40 detected by the force sensor 50 is also passed on to the control unit. According to an alternative of the present invention, only the information is passed on that the plunger 10 has contacted the buffer 40. According to another preferred alternative, the absolute placing force of the plunger 10 on the buffer, or an electric signal representative thereof, is passed on to the control unit.

The placing device 1 also comprises a distance sensor 60. The distance sensor 60 detects the distance of the plunger 10 in the joining direction, and opposite the joining direction. The detected distance of the plunger 10 is preferably passed on in the form of electrical signals to the control unit and is processed there. In the control unit, the distance signal is detected as a function of the time required for the distance so that a distance-time curve of the plunger 10 can be generated from this data. The plunger 10 preferably moves within a hollow cylindrical joining channel 70. According to one embodiment, the joining channel 70 serves as a holding-down element. It is placed on the at least one component 30 to mechanically pretension it at the joining site.

Furthermore, the length of the joining channel 70 is preferably adjustable. By adjusting the length of the joining channel 70, the potential plunger distance is specifically set so that the joint is created before the plunger 10 contacts the buffer 40. During joining, the component 30 is deformed to a various extent depending on the construction and the material of the at least one component 30 until the joint is created. The at least one component 30 is for example elastically deformed to a varying extent in the direction of joining, or respectively it yields to the bolt 20. This deformation of the at least one component 30 must be taken into account when setting the potential plunger distance. That is, the plunger 10 must be able to travel a longer joining distance before it contacts the buffer 40. Otherwise, the traveled plunger distance is only sufficient to deform the at least one component 30 and incompletely drive the bolt 20 into the at least one component 30. Consequently, the length of the joining channel 70 is set so that the potential plunger distance allows the component 30 to be deformed and the bolt 20 to be completely driven in. The plunger 10 does not contact the buffer 40, and the potential plunger distance ends briefly before the buffer 40. Only when the plunger 10 has undesirable excess joining energy will the plunger 10 contact the buffer 40 when the length of the joining channel 70 is set in this manner.

FIG. 2 shows a schematic representation of a preferred embodiment of the placing device 1 for joining flexible components 30 or joining part arrangements. Due to their design and/or the selected material, arrangements of flexible joining parts can be easily deformed by the joining operation, hence they are termed flexible. Thin sheet metal would be a corresponding example in this context. Such sheet-metal is distorted and deformed, including outside of the joining site, during the penetration of the joining part, and this needs to be avoided. Consequently in the arrangement in FIG. 2, components 30 are preferably supported on two sides to the extent that they are also accessible from two sides. A counter bearing 75 is provided for this purpose, whereas the other arrangement corresponds to the placing device 1 according to FIG. 1.

FIG. 3 illustrates a preferred embodiment of the placing device 1 that is fastened to a robot 80. In this arrangement, it is preferred to arrange the force sensor 50 either below the buffer 40 (not shown) or between the robot 80 and placing device 1 in contrast to the placing device 1 in FIG. 1. According to FIG. 3, the force sensor 50 is arranged between the robot 80 and placing device 1. When the plunger 10 contacts the buffer 40, a similar force signal is generated in the sensor 50 as when the force sensor 50 is arranged below the buffer 40. Since the force sensor 50 is in a different position, the sign of the force signals differs between the arrangements in FIGS. 1 and 3. This is because the force sensor 50 between the robot 80 and placing device 1 is subject to traction when the plunger 10 contacts the buffer 40. In contrast, the force sensor 50 in FIG. 1 is subject to pressure when the plunger 10 contacts the buffer 40.

FIG. 6 shows a flowchart of a preferred process monitoring method for high-speed joining. The process monitoring method will be explained with reference to an example of a preferred placing device 1 that joins the bolt 20 by means of compressed air in at least one component 30.

Before automatic joining can occur in an assembly line, a process window is preferably determined for the connections to be created. A plurality of test connections is created in step S1 for this purpose. When the test connections are created in examples of components 30 to be joined later, the joining energy of the bolt 20 is specifically altered. On the one hand, this is done by changing the pneumatic pressure in a pneumatic piston-cylinder drive of the placing device 1 (see step S3). If an electromotive drive of the plunger 10 is used, the speed of the plunger 10 is preferably varied for joining. On the other hand, the bolt 20 is joined by differing the length of the joining channel 70 while the pneumatic pressure remains the same (see above, cf. step S2). It is also preferable to use the two steps S2 and S3 in combination. If the bolt 20 is joined without placing the joining channel 70 on the component 30, the distance between the placing device 1 and component 30 is changed analogous to setting the length of the joining channel 70.

By empirically determining the joining parameters of pneumatic pressure and joining channel 20 length, it is also preferable to exclude the joining parameters at which the plunger 10 touches the buffer 40 or contacts it with excessive placing force (see below).

In step S4, the created test connections are visually inspected (see step S4). Depending on the results of this inspection, the connections are judged be OK (in order) or not NOK (not in order). The assessment also includes the measurement of the head protrusion. The measurement of head protrusion involves measuring how far the head of the bolt 20 protrudes above the component 30. This is schematically illustrated in FIG. 4a. In the diagram on the left in FIG. 4a, the bolt head does not lie on the component 30. Consequently, the connection is NOK. In the middle diagram in FIG. 4a, the bolt head lies on the component 30. The component surface is deformed negligibly or not all in the direction of joining. Consequently, the connection in the middle diagram in FIG. 4 is judged OK. In the right diagram in FIG. 4a, the bolt head lies on the component 30. At the same time, the component surface is significantly deformed in the direction of joining. Consequently, this connection is judged NOK.

The nondestructive visual measurement of the head protrusion according to step S4 is optionally supplemented by measuring the tensile strength of the head of the bolt 20 in the test connection (step S5). The result of testing the tensile strength of the head is schematically illustrated in FIG. 4c. In the diagrams in FIG. 4c, the tensile strength of the head K is plotted against the joining force or joining energy FE of the created connection. The left diagram in FIG. 4c represents the tensile strength of the head in connections when the head protrudes as in the left diagram in FIG. 4a. Since the bolt 20 has not completely penetrated into the component 30, the tensile strength of the head is insufficient for a reliable connection. The tensile strength of the head increases as the joining energy rises. Consequently, connections with this joining energy are judged NOK.

The middle diagram in FIG. 4c shows the tensile strength of the head in connections where the bolts 20 are optimally joined according to the middle diagram in FIG. 4a. It can be seen that the tensile strength of the head of the joined bolt 20 remains constant over a certain range of joining energy FE. This connection is judged OK.

The right diagram in FIG. 4c shows the tensile strength of the head in connections where the bolt 20 is placed too deeply. This is schematically illustrated in the diagram on the right in FIG. 4a. With these connections in which the bolt 20 deforms the component 30 more strongly than in the middle diagram in FIG. 4c, the tensile strength of the head decreases as the joining energy FE increases. Such connections are judged NOK.

It is also preferable to test the torque of the test connections according to step S6 in addition to, or instead of, testing the tensile strength of the head. To this end, the placed bolt 20 is rotated with a defined torque M. If the bolt 20 does not rotate at this defined torque M, the connection is judged in order (OK). If the bolt 20 rotates, the connection is judged not in order (NOK). This torque test is schematically illustrated in FIG. 4b. The torque M is plotted on the y-axis of the shown diagrams. The time of the torque test is plotted on the x-axis of the shown diagrams. The left diagram in FIG. 4b relates to a connection when the head protrudes as in the left diagram in FIG. 4a. There is no torque test in this case since the connection is considered NOK after a visual inspection.

The middle diagram in FIG. 4b illustrates the rotation of the bolt 20 in the test connection which is preferably done using a torque wrench. If the torque wrench is applied to the bolt 20 with a preset defined torque M, a torque limiter releases the wrench in the direction of rotation upon rotating. The torque limiter releases the wrench when the limit torque is greater than the defined torque M. This ensures that the created connection withstands of the defined torque M. The release of the torque limiter is illustrated by the zigzag curve in the middle diagram in FIG. 4b.

Qualitatively, this means that the bolt 20 cannot be rotated by the defined torque M. Instead, the connection withstands the defined torque M so that the torque wrench is automatically released in short intervals. This corresponds to a familiar ratchet in torque wrenches. Since the torque wrench cannot rotate the bolt 20 with the given torque M, the connection is judged OK. The existing connection therefore undergoes a nondestructive test with the assistance of the torque test. This nondestructive torque test is preferably also employed apart from monitoring the process to judge connections. It is preferably also feasible automatically with a device that can apply a specific torque to a joining element.

The right diagram in FIG. 4b shows that the bolt 20 is rotated at a maximum by the defined torque M. This can be seen by the horizontal curve in the right diagram in FIG. 4b. The level of this approximately horizontal curve is located below the zigzag curve in the middle diagram in FIG. 4b because the rotating torque is less than the limit torque of the torque limiter. The connection is therefore to be judged NOK.

With reference to the empirical preliminary tests in steps S1 to S6 or a selection of steps S1 to S6, the joining energy to be applied is determined as well as the length of the joining channel 70 or the distance between the placing device 1 and component 30. Given this joining energy FE and the length of the joining channel 70, the established connection is OK without the plunger 10 contacting the buffer 40. These joining parameters preferably comprise a hydraulic or pneumatic pressure range when joining with a hydraulic or pneumatic piston-cylinder drive to characterize the joining energy. In addition, the joining parameters preferably comprise a speed range for the electromotive drive of the placing device 1.

Despite the known joining parameters, fluctuations in high-speed joining frequently occur that make it necessary to monitor the process. Automatic joints, for example, are created based on these joining parameters. It is also preferable to create individual joints. A preferred process monitoring method will be explained below using an example of a pneumatically-actuated placing device 1. The high-speed joining operation is monitored as follows.

While the bolt 20 is being joined in the components 30, the distance s of the plunger 10 is detected as a function of time t (step S7). By means of the distance sensor 60 that functions according to known technical principles, the distance s is sent to the control unit. A distance-time diagram corresponding to the recorded plunger distance is schematically illustrated in FIG. 5b. In these diagrams, the distance s is plotted on the y-axis, and the time t is plotted on the x-axis.

While determining the distance s, it is determined whether the plunger 10 is contacting the buffer 40. This is done with the assistance of the force sensor 50 or with the electric switch 50 described above. The force sensor 50 supplies the force F with which the plunger 10 contacts the buffer 40. Correspondingly, FIG. 5c schematically illustrates whether a force F was measured as a function of time at the buffer 40. To this end, the force F is plotted on the y-axis, whereas the time t is plotted on the x-axis.

The diagrams on the left in FIGS. 5a, b, c, d represent joining with low joining energy FE which gives rise to a connection that is NOK. The diagrams in the middle in FIGS. 5a, b, c, d represent joining with optimum joining energy FE which gives rise to a connection that is OK. The diagrams on the right in FIGS. 5a, b, c, d represent joining with excessive joining energy FE which gives rise to a connection that is NOK. The connections in the diagrams on the right include for example a component 30 that is strongly deformed or drawn in by the bolt 20 in comparison to the middle diagrams in FIG. 4a.

The left diagram in FIG. 5a shows that joining occurred with insufficient joining energy FE. The plunger 10 joins the bolts 20 in the components 30. The components 30 are elastically deformed in the direction of joining and spring back. The bolt 20 does not completely penetrate the components 30. Consequently, the head of the bolt 20 protrudes above the components 30 as illustrated in FIG. 4a in the diagram on the left. At the same time, it can be seen in the diagram on the left in FIG. 5c (step S8 or S9, S10) that the plunger 10 does not contact the buffer 40. On the basis of this joining operation, the distance-time curve s(t) only indicates a maximum. At the same time, the electric switch or force sensor 50 does not supply any signal as can be seen in FIG. 5c in the diagram on the left. In the distance-time evaluation in step S11, the first and second derivative of the distance-time curve are formed over time. If the first derivative is equal to zero, an extreme is at each of these points. If the second derivative at an extreme is greater than zero, a relative minimum is in the distance-time curve. If the second derivative is at an extreme less than zero, a relative maximum is in the distance-time curve. This computational evaluation is preferably done in the control unit. It is also preferable to determine the minimum and maximum by using a graphic evaluation of the distance-time curve.

In the measurement data in FIG. 5a, the connection is considered NOK on the basis of the evaluation of the distance signal in step S11 (result E2). In addition to this information, the diagram on the left in FIG. 5d indicates the pneumatic pressure in the piston-cylinder drive as a function of time. It can be seen that the pressure decreases while the plunger 10 accelerates toward the component 30. Then the pressure slowly builds in the piston-cylinder drive corresponding to the replenished compressed air which can be seen by the continuously rising pressure as a function of time.

If the bolt 20 is joined with greater joining energy FE as in the middle diagrams in FIG. 4c or 5a, the connection is OK. The plunger distance in the middle diagram in FIG. 5b shows that the plunger 10 joins the bolt 20 with sufficient joining energy FE. This joining energy FE is sufficient to drive in the bolt 20 and elastically deform the components 30. This corresponds to the first maximum in the distance-time curve s(t) in the middle diagram in FIG. 5b. Due to the deformation of the components 30, the components 30 react to the plunger 10. This component reaction moves the plunger 10 back against the joining direction. On the basis of this movement, the first minimum is generated in the distance-time curve s(t). The air in the pneumatic piston-cylinder drive is compressed as the plunger moves against the direction of joining. This compressed air of the piston-cylinder drive subsequently relaxes and again moves the plunger 10 in the joining direction. Despite this movement of the plunger 10, the plunger 10 does not contact the buffer 40. The evaluation described above with the assistance of the first and second derivative of the distance-time curve over time or in a graphic evaluation yields a maximum followed by a minimum (step S11). The created connection is accordingly considered OK (result E1). If the plunger 10 contacts the buffer 40 with a placing force that is below a minimum placing force, it is also preferable to consider this connection OK (step S9, S10).

The middle diagram in FIG. 5d shows how the pressure is reduced in the pneumatic piston-cylinder drive during joining. When the plunger 10 is moved against the joining direction due to the reaction of the component, the pressure in the piston-cylinder drive rises to an intermediate maximum.

If the bolt 20 is joined with excessive joining energy FE, a connection arises that is NOK. This process is shown in the diagrams on the right in FIG. 5a to d. The distance-time curve of the plunger in FIG. 5b in the diagram on the right shows that the plunger 10 initially joins the bolt 20. This is discernible based on the first maximum in the distance-time curve in FIG. 5b and the first minimum in the pressure curve in FIG. 5d in the diagram on the right. At the same time, the plunger contacts the buffer 40 because the joining energy FE is too high. This is signaled either by a force signal or an electric signal as illustrated in FIG. 5c in the diagram on the right (steps S8 or S9, S10). After the bolt 20 is introduced, the component reaction moves the plunger 10 back against the joining direction. This compresses the air in the pneumatic piston-cylinder drive. Due to this compressive component reaction, the first minimum arises in the distance-time curve in FIG. 5b in the diagram on the right. In addition, the first maximum is generated in the pressure-time curve of the piston-cylinder drive in FIG. 5d.

The compression of the air in the piston-cylinder drive is strong enough to accelerate the plunger 10 toward the component when the compression relaxes. Due to this acceleration, the plunger 10 again contacts the bolt 20 in the component 30. This generates the second maximum in the distance-time curve s(t) in FIG. 5b in the diagram on the right. In addition, this process generates the second minimum in the pressure-time curve in FIG. 5d in the diagram on the right.

Subsequently, the minimum and maximum are determined in the distance-time curve in step S11 (see above). This yields at least one maximum followed by a minimum. In addition to the maximum in the distance-time curve, the signal from the electric switch or force sensor 50 is sufficient to signal that the plunger 10 has contacted the buffer 40 (step S8 or steps S9, S10). Joining with excessive joining energy FE is recognized on the basis of this information to the control unit of the placing device 1. The connection is therefore considered NOK (result E2).

In view of the evaluation of the distance-time curve in step S11, the following can be summarized: If the evaluation in step S11 indicates that there is at least one maximum and at least one minimum in the distance-time curve at the determined extreme points, the connection is in order (OK) if the plunger 10 does not contact the buffer 40 while joining. If however the buffer 40 in combination with electric switch or force sensor 50 simultaneously supplies a sufficient signal at the same time as a maximum and minimum in the distance-time curve, the connection is considered not NOK.

The invention claimed is:

1. A process monitoring method of a joining operation of a joining element at a speed of at least 5 m/s into at least one component with the aid of a setting device, said setting device comprising a plunger for setting the joining element, a buffer which limits a maximum deflection of the plunger in a joining direction, and a distance measurement sensor with which the deflection of the plunger can be detected, wherein the monitoring of the process comprises the following steps:
   detecting the path of the plunger during the joining operation as a function of the time in the form of a distance-time curve using the distance measurement sensor;
   detecting a contact of the plunger on the buffer, wherein the buffer of the setting device comprises a force sensor that detects a setting force of the plunger when contacting the buffer;
   outputting of the setting force by the buffer when the plunger contacts the buffer, wherein the contacting of the plunger on the buffer below a minimum setting force, as detected by the force sensor, is not detected as contacting of the plunger of the buffer for purposes of that detecting step; and
   evaluating the distance-time curve such that, in the presence of one maximum representing a sufficient driving of the joining element into the at least one component followed by one minimum in the distance-time curve representing a reaction of the at least one component to the plunger moving the at least one component back against the joining direction, and without detecting contact of the plunger on the buffer, a joint connection is judged to be acceptable during the joining operation covering a period in which the plunger drives the joining element into the at least one component in the joining direction and the plunger experiences a reaction from a component to the joining element causing the plunger to move opposite the joining direction.

2. The process monitoring method according to claim 1, wherein the buffer of the setting device comprises an electrical switch that can be triggered by the plunger, and in which the process monitoring method comprises the additional step of:
   triggering of an electrical signal by the buffer when the plunger contacts the buffer.

3. The process monitoring method according to claim 1, comprising the further step of:
   forming the first and second derivative of the distance-time curve over time to determine the at least one maximum and the at least one minimum.

4. The process monitoring method according to claim 1, comprising the further step of:
   empirically determining the joining energy to be supplied to the joining element along with a distance to be traveled by the joining element to achieve a connection that is acceptable without the plunger contacting the buffer.

5. The process monitoring method according to claim 4, comprising the further step of:
   determining a pressure range when pneumatically or hydraulically joining a joining element, as a reference for the joining energy to be supplied to the joining element.

6. The process monitoring method according to claim 4, comprising the further step:
   determining a speed range of the plunger when electro-mechanically joining a joining element as a reference for the joining energy to be supplied to the joining element.

7. The process monitoring method according to claim 4, comprising the further step of:
   determining a quality of a created joint by means of the tensile strength of the head of the joining element during removal from the at least one component.

8. The process monitoring method according to claim 7, comprising the further step of:
   performing a torque test to determine whether a created connection is acceptable.

9. The process monitoring method according to claim 4, comprising the further step of:
   performing a visual inspection as to whether a created connection is adequate, said inspection being conducted while performing the empirically determining the joining energy step.

10. The process monitoring method according to claim 4, comprising the further step of:
    performing a torque test to determine whether a created connection is acceptable, said torque test performing step being conducted during said empirically determining joining energy step.

11. The process monitoring method according to claim 1, comprising the further step of:
    performing a visual inspection of whether a created connection is acceptable.

12. The process monitoring method according to claim 1, comprising the further step of:
    performing a torque test to determine whether a created connection is acceptable.

13. The process monitoring method according to claim 12, comprising the further step of:

rotating the joined joining element at a defined torque so that the connection can be judged as acceptable if the joining element fails to rotate.

* * * * *